United States Patent [19]
Lisi

[11] 3,785,204
[45] Jan. 15, 1974

[54] MASS FLOW METER
[75] Inventor: Edward L. Lisi, Freeport, N.Y.
[73] Assignee: Esso Research Engineering Company, Linden, N.J.
[22] Filed: Apr. 6, 1972
[21] Appl. No.: 241,140

[52] U.S. Cl. ............................ 73/194 M, 73/205 D
[51] Int. Cl. ............................................... G01f 1/00
[58] Field of Search ................... 73/194 B, 194 M, 73/231 M, 205 D

[56] References Cited
UNITED STATES PATENTS

| | | | |
|---|---|---|---|
| 3,116,639 | 1/1964 | Bird | 73/194 |
| 3,425,274 | 2/1969 | Clement et al. | 73/194 |
| 2,772,567 | 12/1956 | Boden et al. | 73/231 |
| 3,430,489 | 3/1969 | Pfrehm | 73/231 |
| 1,935,445 | 11/1933 | Heinz | 73/194 |
| 3,370,463 | 2/1968 | Chanaud | 73/194 |

*Primary Examiner*—Herbert Goldstein
*Attorney*—Leon Chasan et al.

[57] ABSTRACT

A mass flow meter determines the weight flow of a fluid stream by combining in series a density-sensitive flow measuring device and a density-insensitive flow measuring device. The density-insensitive flow measuring device is a vortex-shedding meter which requires no moving parts to determine volumetric or velocity flow. In combination with the vortex-shedding meter, the density-sensitive flow measuring device may be an orifice meter or preferably a pressure differential instrument connected across the vortex shedding meter itself. Information obtained from the density-sensitive flow measuring device and the density-insensitive flow measuring device may be combined to obtain mass flow rate.

1 Claim, 2 Drawing Figures

PATENTED JAN 15 1974  3,785,204

MASS FLOW METER

BACKGROUND OF THE INVENTION

The measurement of the rate of flow of fluids in a closed conduit is possible by many means well known in the art. Usually it is desired to measure the weight or mass flow rather than volumetric flow. For liquids, density is generally known and since it is not very sensitive to changes in conditions, it is usually sufficient to measure volumetric flow and determine weight flow by multiplying by the average density. In the case of gas flow, however, the density is affected greatly by changes in pressure and temperature, so the determination of actual weight flow from volumetric flow measurements is more difficult, but often is preferred. For example, when measuring fuel gases it is more useful to determine mass flow than volumetric flow since the heat released by combustion is proportional to mass flow but not to volumetric flow. Usually, in industrial processes a constant mass flow is desired in order to hold combustion heat release constant. However, if the molecular weight, pressure, or temperature of a fuel gas changes, the mass flow will change unless it is controlled. To do this, mass flow must be measured.

For many applications turbine-type volume flow meters are used to determine the rate of gas flow. Turbine meters have distinct disadvantages in that they expose moving parts to the flowing fluids and have limited rangeability. The working parts may be adversely affected by any solid particles contained in the gas, may need external lubrication and generally, are undesirably complex.

It is known in the prior art to combine the output of volumetric flow meters, such as turbine meters, with the output of density sensitive meters, particularly orifice meters, in order to obtain a mass flow rate. The mass flow rate is equal to the density multiplied by the volumetric flow rate. The volumetric flow rate may be determined directly by the turbine meter and the density indirectly by the orifice meter, since density is proportional to the pressure drop across the meter if the volumetric flow is known. Such a mass flow determination can be made at additional expense to the cost of basic measuring instruments but subject to the disadvantages heretofore discussed in regard to the turbine meter.

Other mass flow meters include those which measure flow rate by changes in angular momentum or by the voltage generated when a conducting fluid passes through a magnetic field. These meters are not widely used because of their high cost and complexity.

The present invention is directed to providing a mass flow meter having no moving parts and of very simple construction and with a rangeability heretofore unattainable. For this purpose, the present invention combines a volumetric flow meter utilizing the vortex-shedding principle and the pressure differential as measured across said meter in order to derive the mass flow rate of a fluid.

SUMMARY OF THE INVENTION

A novel mass flow meter combines the output of a vortex-shedding meter with the pressure drop measured across said meter. The mass flow may be determined with accuracy over a wide range of flows without being affected by changes in physical properties of the stream flowing. The vortex-shedding meter uses a member inserted into a flowing stream to create fluid vortices and shed them with a frequency proportional to the flow rate. The vortex-shedding meter is insensitive to fluid properties, which makes it particularly useful for measuring the volume flow of gases. It has exceptional accuracy and range and requires little maintenance because it uses no moving parts. The output of such a meter is proportional to the fluid's velocity but usually the internal area is constant so volumetric flow may also be obtained. The vortex-shedding member itself restricts the conduit and creates a pressure drop which can be measured and is proportional to density of the fluid flowing if the volumetric flow rate is known. Since the vortex-shedding meter gives volumetric flow already, it may be combined with the density measurement to derive mass flow rate.

DESCRIPTION OF THE PREFERRED EMBODIMENTS

Figure 1:
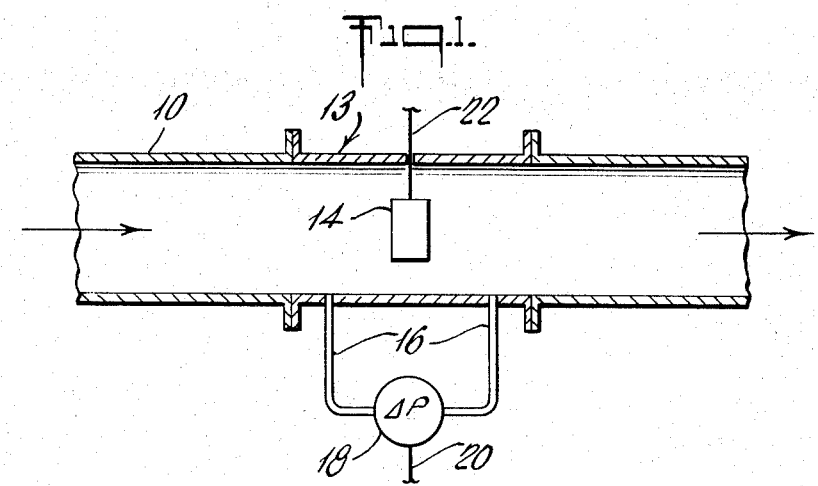
FIG. 1 is a diagram of a mass flow meter according to the present invention.

FIG. 1 illustrates in a partly schematic fashion the mass flow meter of the present invention. Line 10 is the conduit or pipeline in which a fluid, either gas or liquid, may flow. Although it is desirable to measure mass flow in the conduit, most meters are incapable of measuring mass flow directly. If it is possible to measure volumetric flow and density of the fluid either directly or inferentially, it is then possible to combine these two measurements to produce a signal which is proportional to the mass of the fluid flowing. This scheme is illustrated below:

For a vortex-shedding meter:

$$f \approx v$$

where:
$f$ = frequency of vortex shedding
$v$ = velocity of fluid flowing
if cross-sectional area is known:

$$f \approx \text{volumetric flow rate}$$

For a head meter:

$$\Delta h \approx v^2$$

where:
$\Delta h$ = change in pressure across a restriction expressed as the height of a column of the fluid flowing
$v$ = upstream velocity of fluid flowing
Since $\Delta h = \Delta p/\rho$ where
$\Delta p$ = pressure difference
$\rho$ = density of the fluid $$\rho \approx \Delta p/v^2 \text{ or } \rho \approx \Delta p/(\text{volumetric flow})^2$$

mass flow = volumetric flow × density
mass flow ≈ $\Delta p$/(volumetric flow)

Thus, it is seen that the density may be obtained by measuring the pressure drop across a restriction in the conduit if the volumetric flow is independently determined. Ordinarily, a head meter relies on a known cross-section of the instrument, e.g., an orifice opening, and volumetric flow is calculated. However, if the volumetric flow is known from another source, then density may be obtained. Generally, gases are subject to relatively large density changes caused by pressure, temperature, and composition. It can be seen, however, that if a true volumetric flow is known, a density may be obtained without knowing the existing local conditions. Such a density-sensitive meter is obtained by measuring the pressure drop upstream and downstream of a vortex-shedding element 14 to be discussed in more detail below. Since the vortex-shedding element obstructs a portion of the conduit, it creates a restriction in much the same way as an orifice or Venturi tube. Thus, pressure drop may be measured across it and used to obtain density inferentially. Lines 16 represent pressure taps upstream and downstream of the vortex-shedding element from which differential pressure may be measured by a standard delta-P instrument 18. The signal produced by 18, which is proportional to the density of the flowing fluid, may be sent to a mass flow computer (not shown) via electrical connection 20.

Volumetric flow measurement is obtained independent of pressure and composition changes by measurement of the frequency of the vortex-shedding around element 14. Several instruments are commercially available which take advantage of the vortex-shedding phenomenon. An obstruction to fluid flow creates and sheds vortices into the fluid immediately downstream of the element. These vortices shed from first one side of the obstruction and then the other, switching back and forth at a frequency which is directly proportional to linear velocity of the fluid flow. Above a certain minimum velocity, the frequency is not dependent on the fluid properties. If the vortex shedding meter has been designed so that the vortex shedding element occupies a known fraction of the conduit's cross-section, it is possible to read volumetric flow directly. However, if the vortex shedding element is simply an insert into a large conduit of uncertain cross-sectional area, the measurement obtained will be proportional to linear velocity instead. Either of these may be used in combination with density in order to obtain mass flow.

Mass flow is obtained by multiplying the density by the volumetric flow, or the density by the velocity times the cross-sectional area of the conduit. This calculation can easily be made by a simple conventional computing device to produce a signal which is directly proportional to the mass flow. In FIG. 1 the vortex shedding element 14 is shown located within a section of pipe specifically designed for it and generally indicated as 13. In this way, since the cross-section of the conduit at the vortex shedding element is known, it is possible to obtain volumetric flow measurement directly as discussed above. The output of the vortex shedding element is transferred via connection 22 to a suitable amplifier and then to a suitable mass flow computer, neither of which are shown. The combination of the output of the two elements produces a mass flow meter measurement which does not rely on a device having moving parts. It takes advantage of the inherent accuracy of the vortex-shedding meter to produce a simple and reliable mass flow meter measurement.

Figure 2:
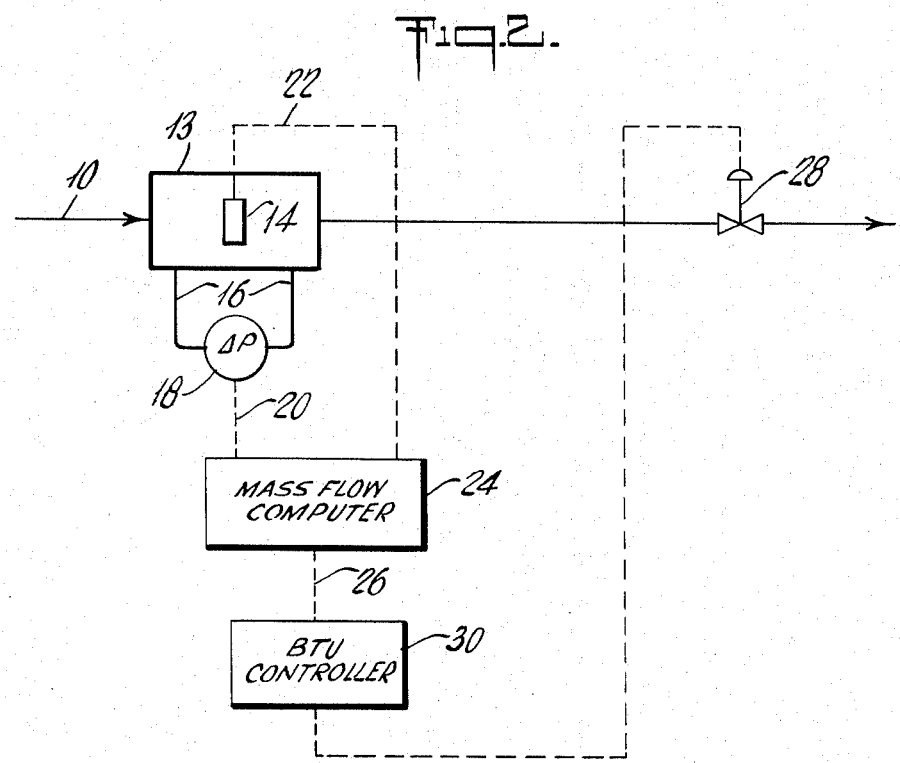
FIG. 2 is a simplified flow sheet illustrating the combination of volumetric flow and pressure drop measurements to adjust a BTU controller.

FIG. 2 illustrates schematically a typical application of such a mass flow instrument used to control the heat input to a furnace (not shown) by measuring and controlling the flow of fuel gases thereto. Typically in refinery operations, it has been found that the fuel gas varies significantly in pressure, temperature and composition since it consists mainly of waste gases. Pressure changes can be compensated for by available equipment but temperature changes are not so easily accommodated and it has heretofore been very difficult to correct for composition changes. The effect of any of these changes is that the combustion rate changes. This is undesirable and causes upsets to the operations which should be minimized. When dealing with hydrocarbon systems it is generally true that the combustion rate is nearly constant if the mass flow is held constant. This is so since most hydrocarbons have very nearly the same heat of combustion per unit mass. Thus, if it is possible to measure directly the mass flow of fuel gases without reference to the line conditions, it is possible to use that mass flow to adjust the fuel flow to a furnace and thereby maintain the combustion rate at the desired constant level.

The fuel flow in line 10 passes through the vortex shedding meter 14 having differential pressure taps generally indicated at 16. The vortex-shedding element 14 is connected by an electrical connection 22 to the mass flow computer 24 which receives from the vortex-shedding element 14 a signal directly proportional to volumetric flow. Pressure differential connections 16 are made upstream and downstream of the vortex shedding element and connected to a standard differential pressure measuring instrument 18. The output of 18, which is proportional to density, is also sent via connection 20 to the mass flow computer 24 where the mass flow is synthesized from the output of the two instruments. The mass flow is then sent from the mass flow computer 24 via electrical connection 26 to the BTU controller 30, which operates directly to reset a valve 28 situated in the fuel gas line 10 downstream of the mass flow meter and upstream of the furnace burners (not shown). The BTU controller takes advantage of the accuracy inherent in the vortex shedding meter and at the same time takes advantage of the insensitivity of the instrument to changes in pressure, temperature and density, reading out correctly mass flow without the use of moving parts and enabling a control of heat release in the furnace which prior to this invention has been impractical to achieve.

The above description of the preferred embodiments is only an illustration of the invention and is not to limit the scope of the claims which follow.

What is claimed is:

1. A meter for measuring the mass flow rate of a fluid passing through a conduit independently of said fluid's physical properties comprising:
   a. a section of said conduit having the same cross-sectional area as the said conduit adjacent the ends thereof thereby introducing no additional pressure drop;
   b. a single non-movable element disposed inside said section so as to interfere with the flow of fluid, thereby causing vortices to be shed from said element and a pressure drop to be established by and across said element;
   c. frequency detecting means for measuring the frequency of vortex-shedding from said element;
   d. differential pressure detecting means operably disposed within said section for measuring pressure drop across said element;
   e. a mass flow computer connected to the frequency detecting means of (c) and the differential pressure detecting means of (d) for receiving the output of said detecting means and computing mass flow as directly proportional to differential pressure and inversely proportional to frequency.

* * * * *